United States Patent
Roell et al.

[11] Patent Number: 6,057,810
[45] Date of Patent: *May 2, 2000

[54] METHOD AND APPARATUS FOR ORIENTATION SENSING

[75] Inventors: Richard Roell, Plano; James Rogers, Irving, both of Tex.

[73] Assignee: Immersive Technologies, Inc., Ludlow, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/667,815

[22] Filed: Jun. 20, 1996

[51] Int. Cl.$^7$ .................................................. G09G 5/00
[52] U.S. Cl. .............................. 345/8; 345/126; 348/115; 359/632
[58] Field of Search .................................. 345/8, 7, 126; 359/632, 630; 348/115

[56] References Cited

U.S. PATENT DOCUMENTS

| | | | |
|---|---|---|---|
| 3,290,985 | 12/1966 | Bains et al. | 350/321 |
| 4,257,062 | 3/1981 | Meredith | 345/8 |
| 4,411,627 | 10/1983 | Breglia et al. | 434/44 |
| 4,884,219 | 11/1989 | Waldren | 364/514 |
| 5,006,072 | 4/1991 | Letovsky et al. | 434/61 |
| 5,252,070 | 10/1993 | Jarrett | 434/59 |
| 5,253,832 | 10/1993 | Bolas et al. | 248/123.1 |
| 5,320,538 | 6/1994 | Baum | 345/8 |
| 5,436,638 | 7/1995 | Bolas et al. | 345/156 |
| 5,644,323 | 7/1997 | Hildebrand et al. | 345/8 |
| 5,855,344 | 1/1999 | Rogers | 248/123.2 |

FOREIGN PATENT DOCUMENTS 53-023601  3/1978  Japan .

OTHER PUBLICATIONS

Ken Pimentel et al., *Virtual Reality, Through the New Looking Glass*, 166–172, 370–373 (2d ed. 1995).

*Primary Examiner*—Steven J. Saras
*Assistant Examiner*—Amr Awad
*Attorney, Agent, or Firm*—Burns, Doane, Swecker & Mathis, L.L.P.

[57] ABSTRACT

An exemplary viewing apparatus comprises a visual display which transmits image data to a user and which is rotatably coupled, preferably in three dimensions, to a boom which supports the visual display. According to one embodiment, the operator inserts his head into the visual display and grasps the control grips with both hands to interact in three dimensions with a virtual world and with virtual objects in the virtual world via graphics displayed to each eye. The visual display may be equipped with sensing devices which allow for the sensing of both location and directional coordinates in three dimensions relative to the user and the virtual world and objects. The visual display preferably houses two LCD displays which direct separate images to the user's eyes so that the images are perceived stereoscopically. Because the visual display is mechanically coupled to the boom, the apparatus may be left unattended. The visual display also preferably has a shape such that it can be used by users of different sizes with minimal setup time.

13 Claims, 5 Drawing Sheets

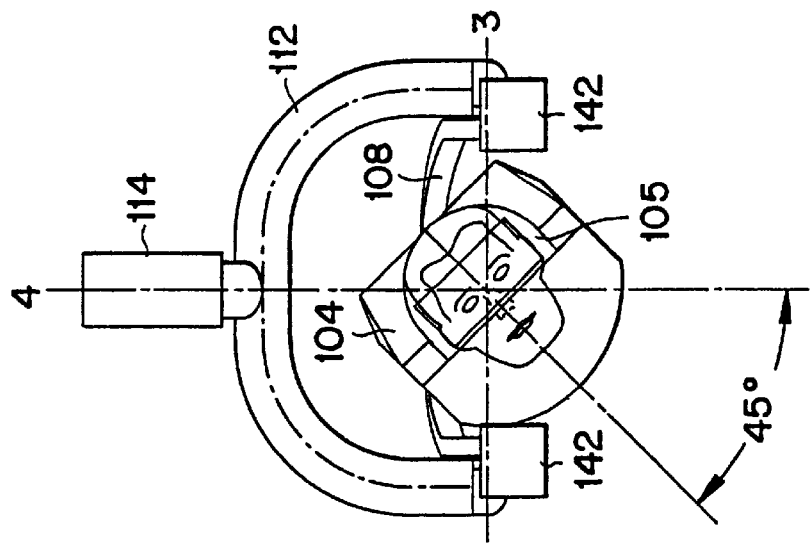
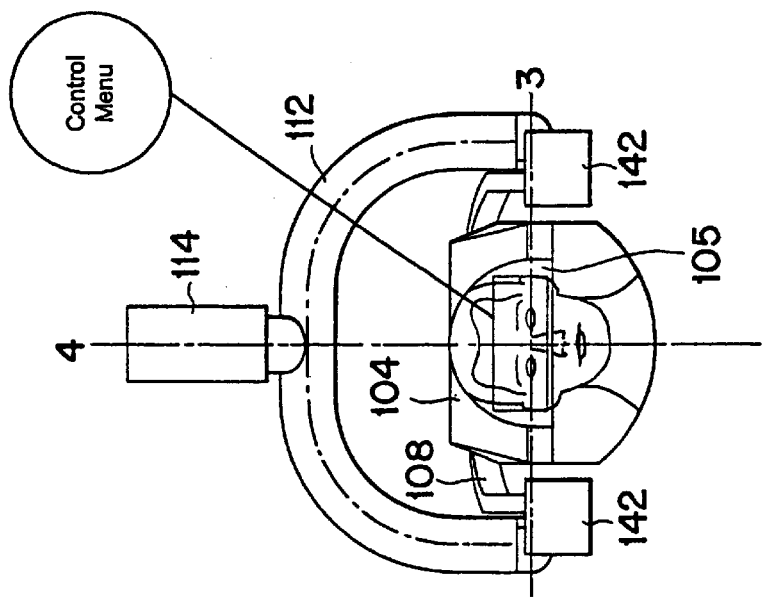
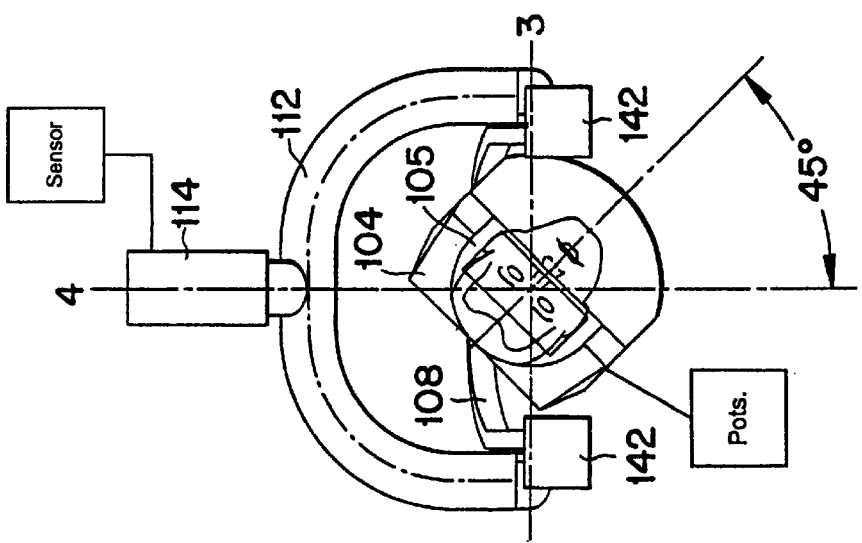

METHOD AND APPARATUS FOR ORIENTATION SENSING

BACKGROUND

The present invention relates generally to a method and apparatus for sensing an orientation, and more particularly to a viewing method and apparatus for sensing an orientation of a user's head and for viewing and maneuvering in and around a computer generated virtual world.

The use of video displays for recreational, educational, and scientific purposes has increased dramatically in recent years. Video displays are commonly used in medical operations, for example, and in many other analytical fields to visually present a simulated environment to a user. Another particular application is in the video game industry where video displays transmit real time image data to a user. The video display is programmed to respond to actions taken by the user through a control mechanism such as a joy stick and is updated in real time.

Recently, video displays have been adapted to be secured a fixed distance in front of the user's eyes and to provide real time image data based on, for example, the movement of the user's head. Commonly known as "virtual reality", a motion sensor senses movement of the user's head and provides a signal representing the motion to a microprocessor which calculates the real time image data based on the signal.

In many known systems, the video display is fixed inside a helmet which the user wears while using the apparatus. U.S. Pat. No. 4,884,219, for example, discloses an apparatus for the perception of computer-generated imagery comprising a helmet which includes two visual display units and a first module containing three small coils. A second module also having three small coils is fixed at a location remote from the helmet. The second module acts as a transmitter to generate a low frequency electric field. The first module acts as a moveable sensor which samples the field generated by the second module. An electronics decode circuit decodes a signal from the first module and computes the sensor's position and orientation in angular coordinates.

Although this helmet-type apparatus may be used to sense an orientation of the user's head and to calculate image data, it has several disadvantages. For example, people who use the apparatus will have different sized heads. The helmet, therefore, will typically have to include a relatively complex mechanism for allowing a size adjustment of the helmet before each person uses the apparatus. It is usually necessary, therefore, to hire an attendant to assist users in fitting the helmet to the user's head, which has obvious cost disadvantages. Each fitting may also take an undesirably long period of time, which significantly curtails receipts, and which may deter potential users from waiting in line to use the apparatus.

In addition, the use of the same helmet by all users may cause problems with respect to hygiene, which may deter a significant number of potential user's from using the apparatus. Moreover, because the helmet is not supported other than by resting on the user's head, the mass of the helmet must be kept at a reasonable mass, which may significantly affect the quality and size of the visual display units which can be used.

In other known systems, a visual display is suspended from a boom which may be counterbalanced such that the visual display does not weigh down on the user's head. U.S. Pat. No. 5,253,832, for example, discloses a spring counterbalanced boom suspension system in which the visual display is suspended from a boom arm which is rotatably connected to a cantilever arm. In this system, however, the freedom of motion of the visual display is substantially more limited than in the helmet-type apparatus of the above-cited U.S. Pat. No. 4,884,219. For example, the visual display can rotate only about two axes with respect to the boom arm which supports it. Also, the apparatus is designed to be lightweight, which may significantly limit the size and quality of the LCD units which may be used in the visual display. In addition, the use of springs for counterbalancing cannot provide the precision of using counterweights, since the spring constant is not easily adjusted and may vary somewhat as the spring is expanded or contracted.

It would be desirable, therefore, to have a viewing apparatus which provides image data to a user based on the movement of the user's head, which can be used by any user without a significant setup time, which supports relatively large LCD displays, which allows a high degree of rotational freedom, and which can be left unattended without risk of damage to the apparatus.

SUMMARY

Exemplary embodiments of the present invention generally take the form of a visual display or "visor" supported by a mechanism which allows rotation about three axes to accommodate freedom of motion and to sense an orientation of the user's head. Sensors may be provided to sense the angular position of the viewing apparatus with respect to the three axes of rotation and to generate control signals indicative of the angular position. The control signals generated by the sensors may be transmitted to a processor which calculates individual images to be transmitted to each eye of the user. The images are calculated in accordance with the sensor data together with data relating to the apparent spatial relation of the user to a virtual model. The apparatus preferably comprises a pair of high resolution visual display units such as LCD displays which present stereoscopic computer-generated images to respective mirrors in front of the user's eyes.

An exemplary viewing apparatus may thus comprise a visual display which transmits images to a user, a first member rotatably connected to the visual display about a first axis, a second member rotatably connected to the first member about a second axis perpendicular the first axis, and a third member rotatably connected to the second member about a third axis perpendicular to the first and second axes.

An exemplary method for sensing an orientation comprises the steps of rotatably coupling a visual display to a first member about a first axis, rotatably coupling the first member to a second member about a second axis, and rotatably coupling the second member to a third member about a third axis. The second member may be coupled to the third member such that the second member rotates 360 degrees about the third axis which is perpendicular to the first and second axes.

This system allows for the orientation of a user in a three-dimensional virtual world coordinate system. In addition, the apparatus may provide the user with the ability to manually control forward, backward, up, down, left, and right translational motion within the virtual world, and to control other software responses.

BRIEF DESCRIPTION OF THE DRAWINGS

The foregoing and other objects, features and advantages of the present invention will be more readily understood upon reading the following detailed description in conjunction with the drawings in which:

FIGS. 3A–3C illustrate rotation of the visual display about the roll axis according to an exemplary embodiment of the invention;

DETAILED DESCRIPTION

In general, the apparatus according to exemplary embodiments of the present invention includes a mechanism for sensing an orientation of the user's head in three dimensions, and one or more processors to generate image data for each eye based on the sensed orientation. The processor can create a "virtual world" with the image data it generates. The virtual world may include stationary and moving objects, for example, with which the user interacts. The spatial coordinates of the virtual model can be recalculated in real time so that the objects in the virtual world may be perceived to move relative to the user.

The user's position in the virtual world may be a hypothetical position which the user, through the use of suitable controls, instructs the processor to adopt. Inside the apparatus, the user will be blind to the real world, but the images presented to the user may include a control menu, for example at the periphery of the user's field of view. Through manual controls or sensors, the user can access the control menu to perform various functions. For example, with the control menu, the user may select from different viewpoints of the virtual world. In a first mode, the images presented to the user may be computed such that the user sees a representation of his person in the virtual world. According to a second mode, the images are computed such that the user views the virtual world through a virtual helmet, as if inside the virtual helmet. In a third mode, the images are computed so that the user views the virtual world from outside of the virtual helmet, with an unobstructed field of view. The control menu may also allow the user to change his position in the virtual world so that the perceived images are calculated from a different standpoint.

Figure 1:
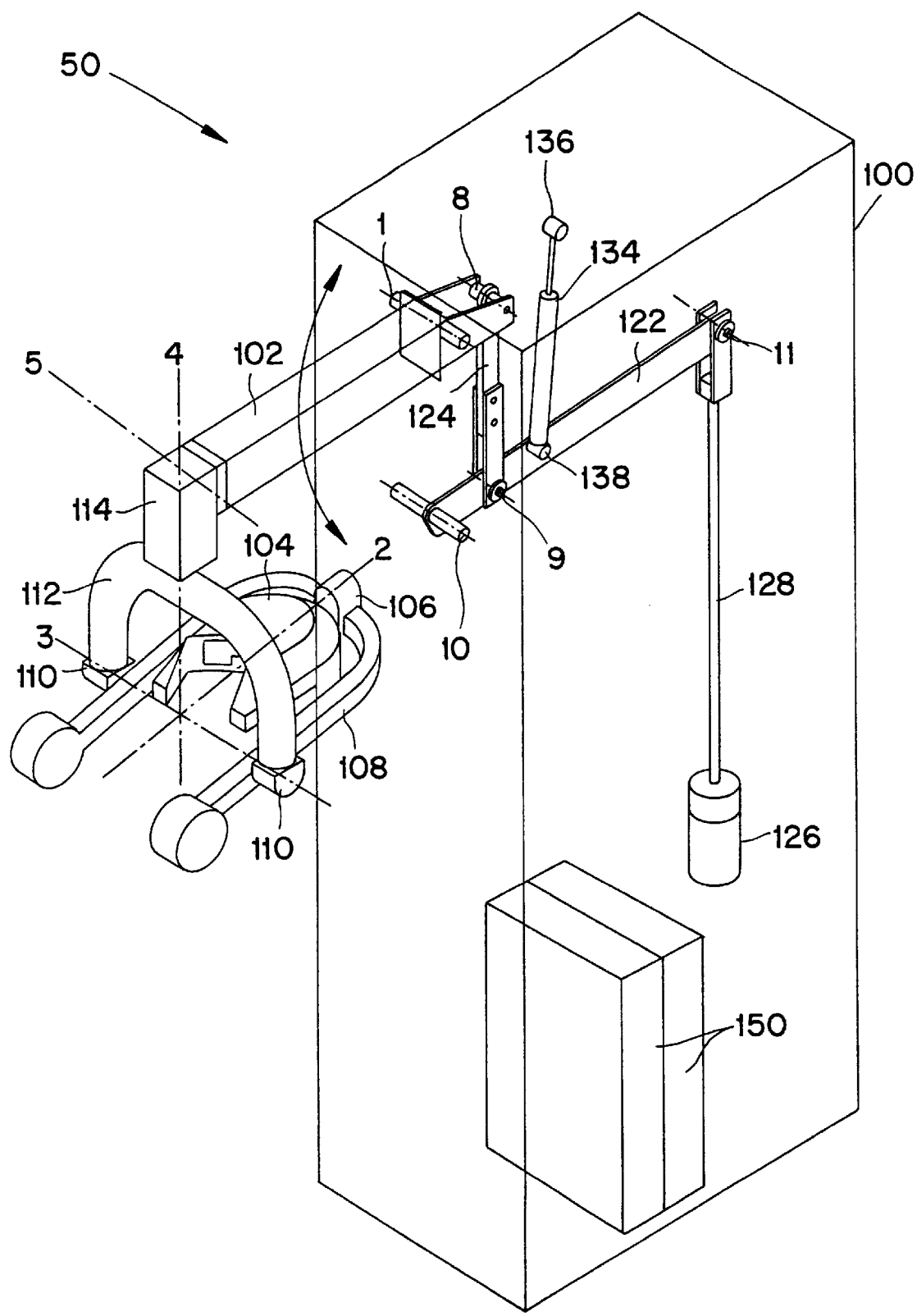
FIG. 1 is a perspective view of a viewing apparatus according to an exemplary embodiment of the invention.

Referring now to FIG. 1, an exemplary viewing apparatus includes a cabinet or housing 100, a boom 102 rotatably mounted on the cabinet 100 at an axis 1, and a visual display 104 which is mechanically coupled to the boom 102. Inside the cabinet 100 is housed at least one and preferably two processors 150 which receive signals indicating the orientation of the visual display 104 and which calculate image data for the visual display 104 based on the received signals.

The rotatable boom 102 allows the visual display 104 to be lowered and raised to accommodate users of different heights. As described in commonly owned U.S. Application Ser. No. 08/668,259, entitled "Method and Apparatus for Counterbalancing", filed on the same date as the present invention, which is hereby incorporated by reference, the boom 102 which supports the visual display 104 is preferably counterbalanced by a counterweight boom 122. The counterweight boom 122 is rotatably mounted on the cabinet 100 at an axis 10 and is coupled to the boom 102 with a linking member 124. The linking member is rotatably connected to the boom at an axis 8 and rotatably connected to the counterweight boom at an axis 9. Because the axes 1 and 10 are fixed, the counterweight boom 122 follows the motion of the boom 102. By locating the counterweight boom 122 below the boom 102, the center of mass of the apparatus is lowered, which significantly improves the stability of the apparatus.

The counterweight boom 122 may be weighted at an axis 11 with a counterweight 126. The counterweight 126 is preferably suspended a predetermined distance below the counterweight boom 122 with a shaft 128 which further lowers the center of mass of the apparatus 50. To limit the velocity at which the boom 102 and counterweight boom 122 may travel, a stabilizing cylinder 134 can be provided. The stabilizing cylinder 134 is preferably a conventional unbiased gas cylinder which has an equal resistance to being expanded or contracted in length. By limiting the velocity of the boom 102 and counterweight boom 122, safety of the apparatus is enhanced and the risk of damaging the apparatus is reduced.

Figure 2:
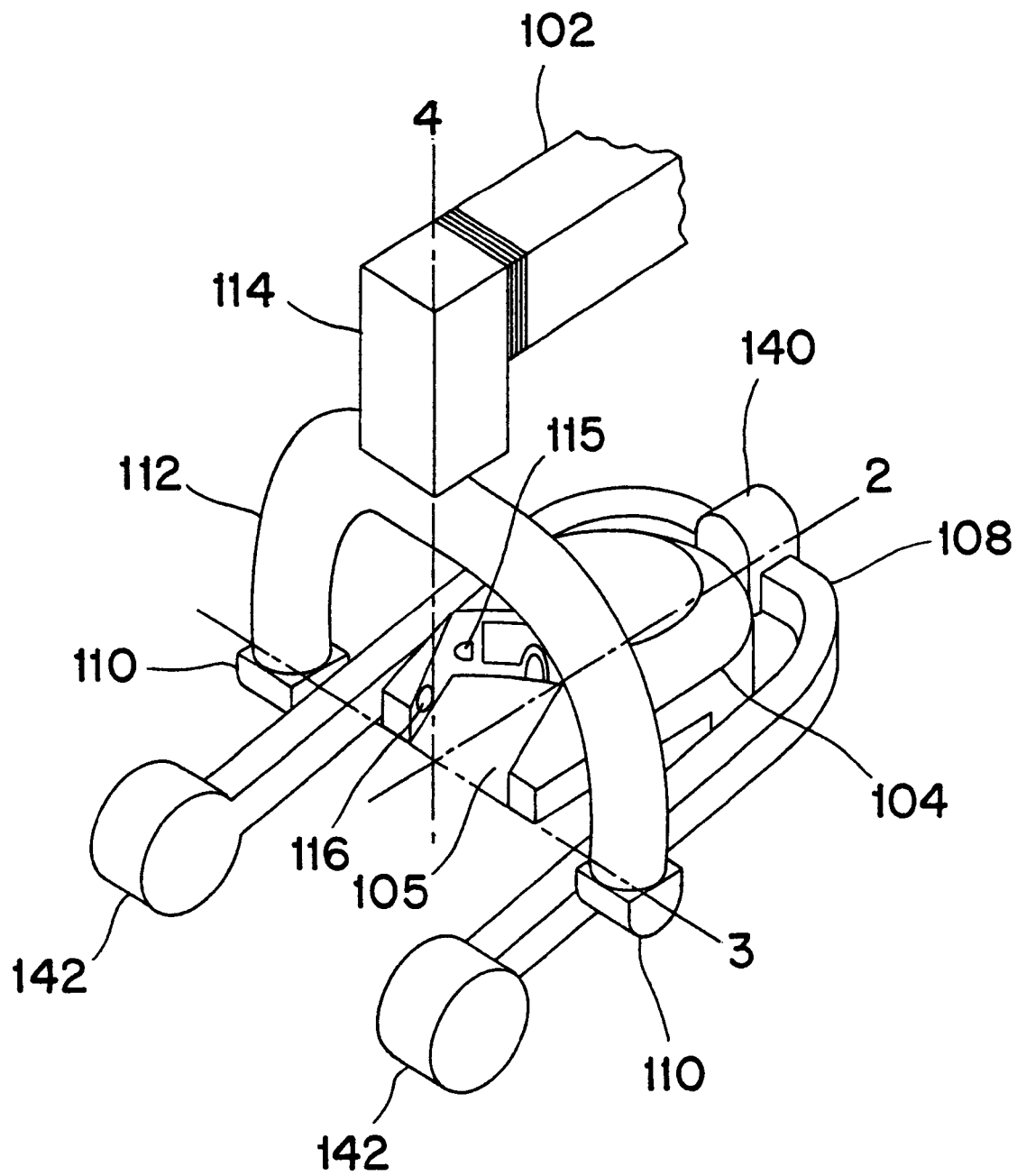
FIG. 2 is an enlarged view of the visual display of FIG. 1.

According to a preferred embodiment of the invention, the visual display 104 is connected to the boom 102 such that it may be rotated about three mutually perpendicular axes. As shown in FIG. 2, the visual display 104 is supported by a bearing assembly 140 to allow free rotation about a roll axis 2. The bearing assembly 140 may be fixed to a pitch yoke 108. The pitch yoke 108 may be rotatably connected to a yaw yoke 112 by bearing assemblies 110 allowing rotation of the pitch yoke 108 about a pitch axis 3.

Figure 5:
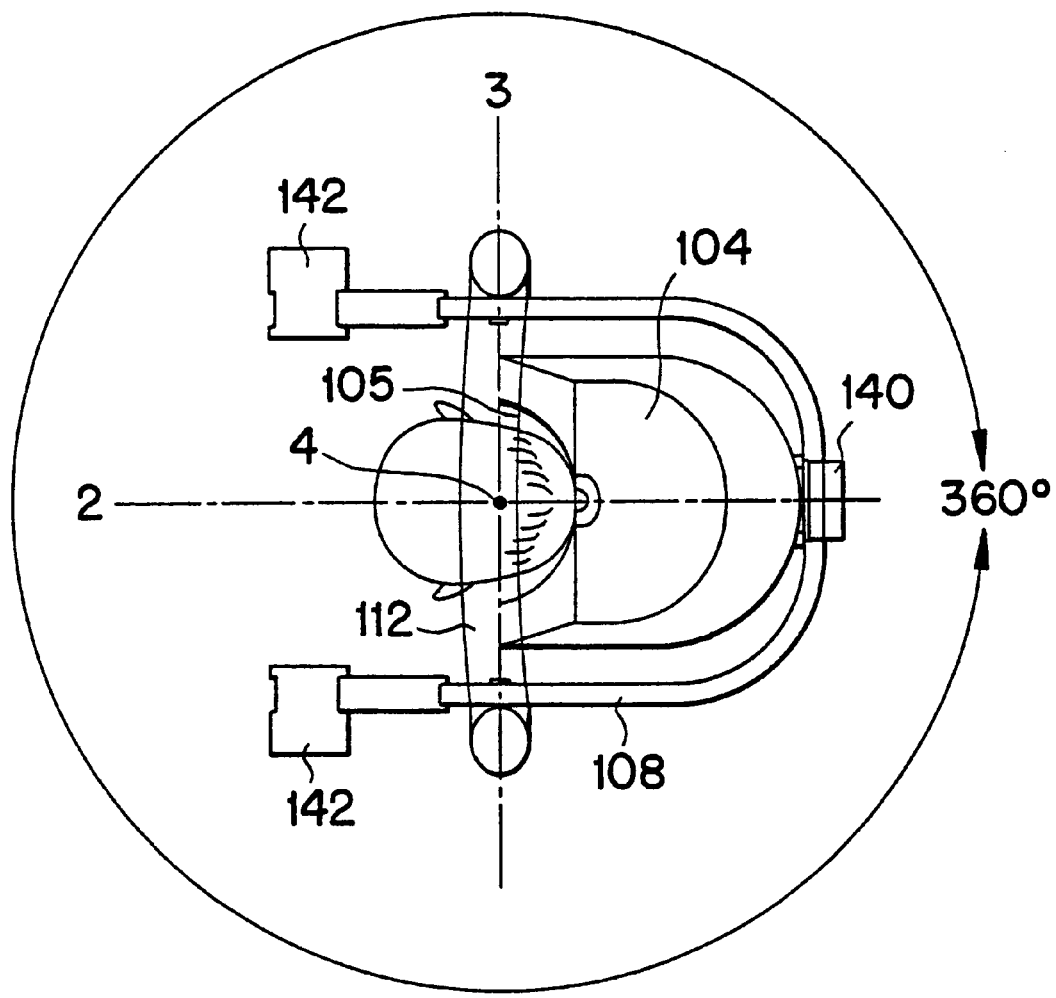
FIG. 5 illustrates rotation of the visual display about the yaw axis according to an exemplary embodiment of the invention.

The pitch yoke 108 may be generally U-shaped and may include counterweights 142 located opposite the connection between the pitch yoke 108 and the visual display 104. The counterweights 142 balance the torque imparted about the pitch axis 3 due to the weight of the visual display 104 on the pitch yoke 108. The counterweights 142 may be connected to a shaft into which the pitch yoke 108 is slidably inserted to a distance which counterbalances the weight of the visual display 104 about the pitch axis 3, as best shown in FIG. 5. The counterweights 142 may be secured at the distance which balances the visual display 104 by any suitable means, such as a removable screw. The position of the counterweights 142 may be adjusted at any time, for example if a visual display of different mass is used, to counterbalance the visual display 104. The counterbalancing of the visual display 104 with the counterweights 142 provides the advantage that the visual display 104 does not need to be limited by size or weight constraints. This allows large LCD displays to be installed in the visual display 104 which occupy a large portion of the user's field of vision.

The yaw yoke 112, which may also be generally U-shaped, may be rotatably connected to the boom 102 through a bearing assembly 114 which allows rotation about a yaw axis 4. As described in the above-cited U.S. Application Ser. No. 08/668,259, the boom 102 may include a linking member inside the boom 102 which is rotatably fixed to the housing 100 and which connects to the bearing assembly 114 to allow the bearing assembly 114 to always maintain a vertical orientation. Thus, when the boom 102 is raised or lowered to accommodate users of different heights, the linking member inside the boom 102 causes the angle between the boom 102 and the bearing assembly 114 to change so that the bearing assembly 114 remains vertically oriented.

Rotation of the visual display 104 about the roll axis 2 may be limited by mechanical stops, as shown in FIG. 3, for example to a roll angle of ±45 degrees. Inside the visual display 104 may be housed a potentiometer connected to a shaft of the bearing assembly 140 by a coupling. The potentiometer may be an analog device which outputs a voltage indicative of (e.g., proportional to) the roll angle between the visual display 104 and the pitch yoke 108. For example, the potentiometer may output voltages between +5V and −5V as the roll angle changes from +45° to −45°. The output voltage is transmitted to the processor 150 which calculates image data based on the output voltage indicative of the roll angle.

Figure 4C:
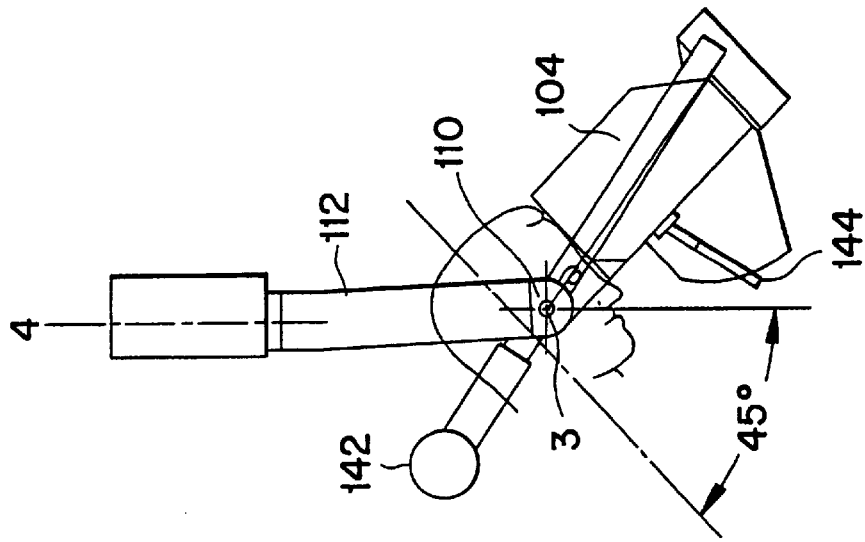
FIGS. 4A–4C illustrate rotation of the visual display about the pitch axis according to an exemplary embodiment of the invention.
Figure 4B:
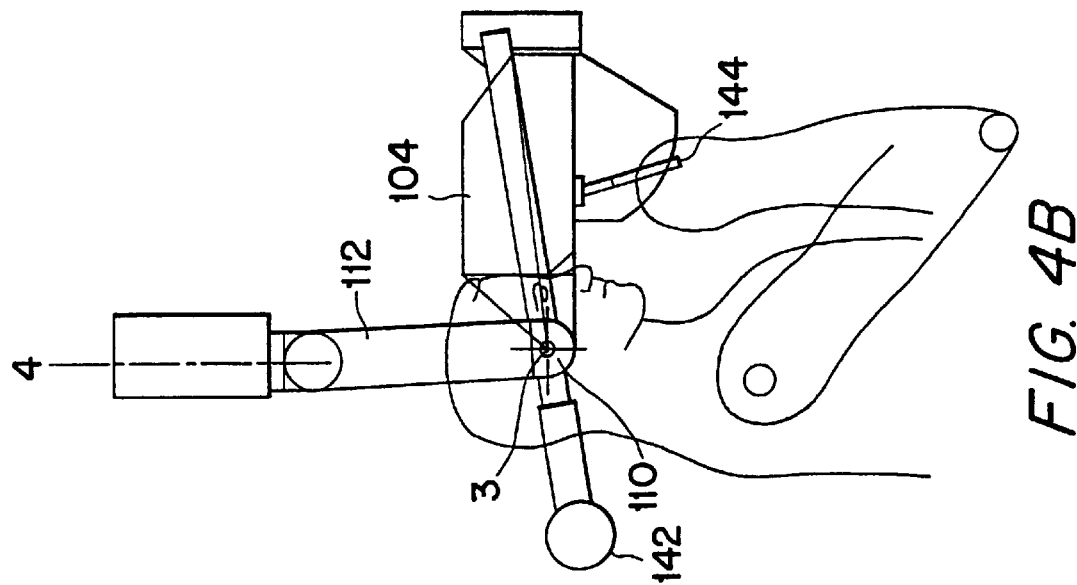
Figure 4A:
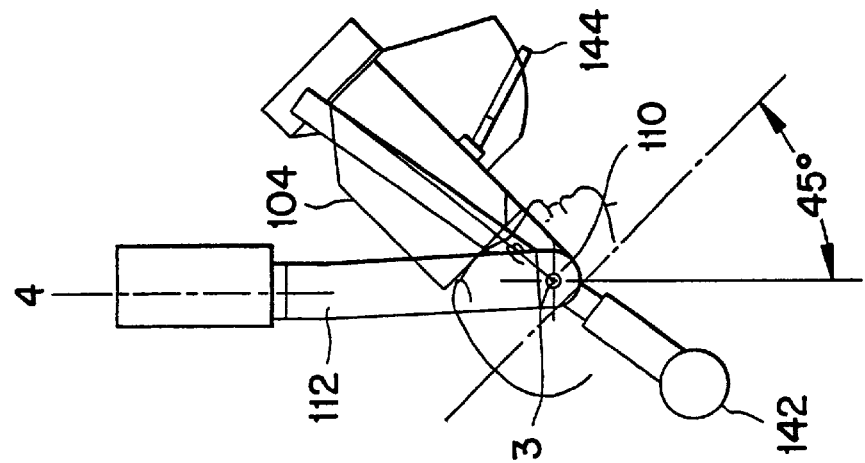

Rotation about the pitch axis 3 may be limited by mechanical stops which allow rotation to a maximum positive angle such as +45° as shown in FIG. 4A, and to a maximum negative angle such as −45° as shown in FIG. 4C. To sense the pitch angle of the visual display 104, a potentiometer may be mounted in a housing of one of the bearing assemblies 110 and may be connected by a coupling to a pitch shaft which connects the pitch yoke 108 to the yaw yoke 112. The potentiometer outputs a voltage indicative of the pitch angle between the pitch yoke 108 and the yaw yoke 112. The output voltage is used by the processor or processors 150 to calculate image data based on the pitch angle indicated by the output voltage.

According to a preferred embodiment, the yaw yoke 112 is rotatably connected to the boom 102 via a bearing assembly 114 which allows a full 360° of rotation without restriction at any angle about the yaw axis 4 as shown in FIG. 5. To sense the yaw angle, a conventional optical encoder or quadrature pulse generator may be installed in the yaw bearing assembly 114 and attached to a shaft of the yaw yoke by a coupling. The optical encoder may include a pair of LEDs which emit pulses responsive to the amount of rotation of the yaw yoke 112 about the yaw axis 4. The optical encoder also preferably includes a light sensor which senses the pulses output by the LEDs and which transmits a signal indicative of the yaw angle to the processor 150. A yaw angle of zero is initialized at the orientation of the yaw yoke when the processor 150 is booted. The two potentiometers and the optical encoder may thus be mounted in the mechanical rotation points shown in FIG. 2 on axes 2, 3, and 4, respectively, which allow for easy movement which correlates to the body's own natural abilities.

The apparatus is preferably constructed to rotate about axes which coincide with the natural axes of rotation of the user's head. For example, the visual display 104, pitch yoke 108, and yaw yoke 112 may be configured such that the roll axis 2 passes just above the user's nose, the pitch axis 3 passes through the user's head just below and behind the ears, and the yaw axis 4 passes through the user's head at the back of the head near the spinal cord. In this way, the apparatus cooperates with the natural motion of the user's head.

According to preferred embodiments of the invention, the visual display 104 is designed to allow a user to quickly use the apparatus with minimal setup time. The visual display 104 preferably includes a recess 105 (see FIG. 2) which receives the user's head. As shown in FIGS. 3 and 5, the recess 105 is formed so that it can receive a range of head sizes. As shown in FIGS. 4A–4C, a handle or handles 144 may be attached to the visual display which a user grasps to pull the front face of the visual display 104 into contact with the user's face and to control the orientation of the visual display 104. These features, together with the boom 102 which supports the visual display 104, allow a user of any size to quickly walk up to the apparatus 50, grasp the handles 144, bring the user's face into contact with the front face of the visual display 104, and begin to use the machine, which significantly reduces setup time.

The handles 144 can be equipped with at least one trigger or other suitable signalling device to indicate a translational motion which the user desires in a virtual world. For example, triggers can be provided on the handles 144 to allow the user to travel in three degrees of translational freedom within the virtual world, in addition to the three degrees of rotation freedom provided by the yaw yoke 112, pitch yoke 108, and bearing assemblies 110, 114 and 140. The visual display 104 can also include at least one speaker 115 (see FIG. 2) for each ear to provide audio to the user.

According to a preferred embodiment of the invention, two speakers 115 are provided for each ear. One of the two speakers is preferably positioned slightly forward of the ear and the other of the two speakers is preferably positioned slightly behind the ear. This configuration maybe adopted for each ear. In this way, the audio program can be provided to the user from a selected one or more of the four speakers such that the audio program has a spatial dimension. The user thus perceives that a sound of the audio program is emanating from a specific direction which may correspond, for example, to the location of a virtual object in the virtual world. Through the proper combination of speakers, the sound can be made to emanate from any direction. Of course, additional speakers may be provided above and below each of the user's ears to add a third vertical dimension of the audio program.

One advantage provided by exemplary embodiments of the present invention relates to the balancing of the visual display 104 by the boom 102 and counterweight boom 122. Because the visual display 104 is supported by the boom 102 and not by the user, the mass of the visual display 104 does not have to be kept to a minimum, as in conventional helmet-type designs. This allows for the utilization of relatively large LCD displays. For example, rather than being limited to lightweight LCD displays having a diagonal of less than an inch, exemplary embodiments of the present invention allow much larger LCD displays to be used, for example LCD displays having a diagonal of 2, 3, 4, 5 or more inches. The use of larger LCD displays greatly increases the satisfaction of the user because the large LCD displays occupy a much larger portion of the user's field of vision. Those skilled in the art will also appreciate that other types of displays, for example plasma LCDs or flat screen CRTs, may be used in conjunction with the present invention.

The support of the visual display 104 by the boom 102 provides the additional advantage that the apparatus 50 can be left unattended without risk of damage to the apparatus. The visual display 104 is preferably securely attached to the boom 102 via the pitch yoke 108, yaw yoke 112, and bearing assemblies 110, 114 and 140. In addition, the velocity of the boom 102 may be limited by the stabilizer cylinder 134 shown in FIG. 1. These features can prevent the visual display 104 from being moved in a manner which would damage the visual display 104. Consequently, the apparatus 50 can be installed at a variety of locations without the need for an attendant.

According to a preferred embodiment of the invention, two LCD displays, each having a diagonal of approximately 5 inches, are provided in the visual display 104 to transmit images to a user. The LCD displays may substantially fill the field of vision of the user with computer-generated images. The processor 150 is preferably programmed to generate individual image data of the virtual model for each eye of the user in accordance with sensed variations in the orientation and position of the user. The virtual model may therefore be perceived stereoscopically, which enhances the realism of the virtual world. If two processors 150 are implemented, each processor can be dedicated to computing image data for one eye. The use of a processor 150 for each eye may significantly improve the quality of the image data transmitted to the user.

To calculate the image data, the processors 150 receive signals representing the roll, pitch, and yaw of the visual display 104. This data is processed by the processors 150 to compute a graphical representation for each eye. The data represents the orientation of the user's head with the 3-dimensional world. Additional signals can be transmitted from the handle 144 of the apparatus 50, which enables the user to move in translation in the virtual world e.g., forward, backward, up, down, left, and right. The additional translation movement controls can be independent of the fixed location of the visual display 104, and may be limited only by the definition of the virtual world.

As will be readily appreciated by those skilled in the art, the present invention provides many significant advantages for sensing an orientation of a user in conjunction with a virtual world. For example, because the visual display may be supported by a boom and mechanically coupled to the boom, the risk of damage to the visual display is minimal. This allows the apparatus to be left unattended and greatly increases the number of potential sites at which the apparatus may be installed, as compared with a helmet-type apparatus. In addition, the supporting boom 102 and the counterweighted pitch axis 108 allow for the use of relatively large LCD displays in the visual display so that a large portion of the user's field of vision is occupied. The use of a counterweight boom located below the supporting boom increases the stability of the apparatus by lowering its center of mass. The configuration of the visual display can reduce the setup time for each user, because the user may simply walk up to the apparatus, bring his face into contact with the visual display, and immediately begin to use the apparatus. The use of a processor dedicated for each eye can significantly improve the quality of the image data transmitted to the user.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A viewing apparatus comprising:
   a visual display which transmits images to a user;
   a first member rotatably connected to the visual display about a first horizontal axis;
   a second member rotatably connected to the first member about a second horizontal axis perpendicular to the first horizontal axis, wherein said first and second horizontal axis are located in a same plane;
   a third member rotatably connected to the second member about a third vertical axis; and
   an indicator disposed on the visual display for indicating a translational motion.

2. The viewing apparatus of claim 1, wherein the indicator is a manual control.

3. The viewing apparatus of claim 1, further comprising:
   a boom connected to the third member; and
   a counterweight boom mechanically coupled to the boom such that the boom and the counterweight boom move in unison, wherein the counterweight boom is disposed below the boom.

4. The viewing apparatus of claim 3, wherein the counterweight boom is enclosed within a housing.

5. The viewing apparatus of claim 1, wherein the visual display comprises two LCD displays which each have a diagonal of not less than 3 inches.

6. The viewing apparatus of claim 1, wherein the second member is free to rotate 360 degrees about the third vertical axis without restriction at any angle.

7. The viewing apparatus of claim 1, further comprising:
   a first potentiometer for sensing a first angular position of the visual display with respect to the first member about the first horizontal axis;
   a second potentiometer for sensing a second angular position of the second member with respect to the first member about the second horizontal axis; and
   an optical encoder for sensing a third angular position of the third member with respect to the second member about the third vertical axis, wherein the optical encoder senses the third angular position over 360 degrees without restriction at any angle.

8. A viewing apparatus comprising:
   a visual display which transmits images to a user;
   a first member rotatably connected to the visual display about a first horizontal axis;
   a second member rotatably connected to the first member about a second horizontal axis perpendicular to the first horizontal axis, wherein said first and second horizontal axis are located in a same plane; and
   a third member rotatably connected to the second member about a third vertical axis;
   wherein the first member comprises a first U-shaped yoke which is rotatably connected to the visual display along a centerline of the first U-shaped yoke; and
   the second member comprises a second U-shaped yoke which is rotatably connected to sides of the first U-shaped yoke.

9. A viewing apparatus comprising:
   a visual display which transmits images to a user;
   a first member rotatably connected to the visual display about a first horizontal axis;
   a second member rotatably connected to the first member about a second horizontal axis perpendicular to the first horizontal axis, wherein said first and second horizontal axis are located in a same plane;
   a third member rotatably connected to the second member about a third vertical axis;
   wherein the first member comprises a counterweight which counterbalances a torque imparted on the first member by the visual display about the second horizontal axis.

10. The viewing apparatus of claim 9, wherein a position of the counterweight with respect to the first member is adjustable so as to vary a counterbalancing torque provided by the counterweight.

11. The viewing apparatus of claim 9, wherein the visual display comprises a first speaker positioned forward of a first ear of the user and a second speaker positioned rearward of the first ear of the user.

12. The viewing apparatus of claim 9, wherein the visual display comprises two LCD displays which each have diagonals of at least 3 inches.

13. The viewing apparatus of claim 12, wherein the control unit generates different image data for each of the two LCD displays.

* * * * *